(12) United States Patent
Kubik

(10) Patent No.: US 6,508,641 B1
(45) Date of Patent: Jan. 21, 2003

(54) DEVICE FOR PROCESSING A STRIP OF MATERIAL WITH ULTRASOUND

(75) Inventor: Klaus Kubik, Tönisvorst (DE)

(73) Assignee: Eduard Kusters Maschinenfabrik GmbH & Co. KG, Krefeld (DE)

( * ) Notice: Subject to any disclaimer, the term of this patent is extended or adjusted under 35 U.S.C. 154(b) by 0 days.

(21) Appl. No.: 09/601,517
(22) PCT Filed: Jan. 20, 1999
(86) PCT No.: PCT/EP99/00346
§ 371 (c)(1),
(2), (4) Date: Oct. 2, 2000
(87) PCT Pub. No.: WO99/38666
PCT Pub. Date: Aug. 5, 1999

(30) Foreign Application Priority Data

Feb. 2, 1998 (DE) .......................................... 198 03 638

(51) Int. Cl.⁷ .............................................. B29C 65/08
(52) U.S. Cl. ................. 425/174.2; 425/445; 156/580.1; 156/580.2
(58) Field of Search ............................. 425/149, 174.2, 425/445; 156/73.1, 73.4, 580.1, 580.2; 100/50

(56) References Cited

U.S. PATENT DOCUMENTS

| 3,493,457 | A | * | 2/1970 | Jugler ..................... 156/580.1 |
| 4,047,992 | A | * | 9/1977 | Williams et al. ........... 156/73.1 |
| 4,048,004 | A | | 9/1977 | Watkins |
| 4,088,519 | A | | 5/1978 | Johnson |
| 5,110,381 | A | * | 5/1992 | Heckard et al. ............... 156/64 |
| 5,749,987 | A | | 5/1998 | Wannebo ..................... 156/64 |
| 6,036,796 | A | * | 3/2000 | Halbert et al. ................. 156/64 |
| 6,190,296 | B1 | * | 2/2001 | Gnad et al. ..................... 493/8 |

FOREIGN PATENT DOCUMENTS

| DE | 31 43 030 | 6/1982 |
| DE | 34 10 954 | 9/1984 |
| DE | 281 038 | 7/1990 |
| DE | 39 21 653 | 1/1991 |
| DE | 40 26 711 | 2/1992 |
| DE | 44 39 284 | 4/1996 |
| DE | 195 13 246 | 4/1996 |
| DE | 44 39 470 | 5/1996 |
| DE | 195 26 354 | 1/1997 |
| EP | 0 421 019 | 4/1991 |
| EP | 0 920 977 | 6/1999 |
| GB | 2 278 312 | 11/1994 |
| GB | 2 279 034 | 12/1994 |
| GB | 2 283 700 | * 5/1995 |
| JP | 8-229446 | 9/1996 |
| WO | 96/14202 | 5/1996 |
| WO | 97/01432 | 1/1997 |
| WO | WO 97/34707 | 9/1997 |

* cited by examiner

Primary Examiner—Jan H. Silbaugh
Assistant Examiner—Donald Heckenberg
(74) Attorney, Agent, or Firm—Kenyon & Kenyon

(57) ABSTRACT

A device for processing a continuously running strip of material includes an ultrasonic generator unit with a sonotrode that is fixed opposite a counter roller. The material strip is processed in the gap. To adjust the gap height, the force in the gap is measured using a force measuring member, and used for regulation.

5 Claims, 1 Drawing Sheet

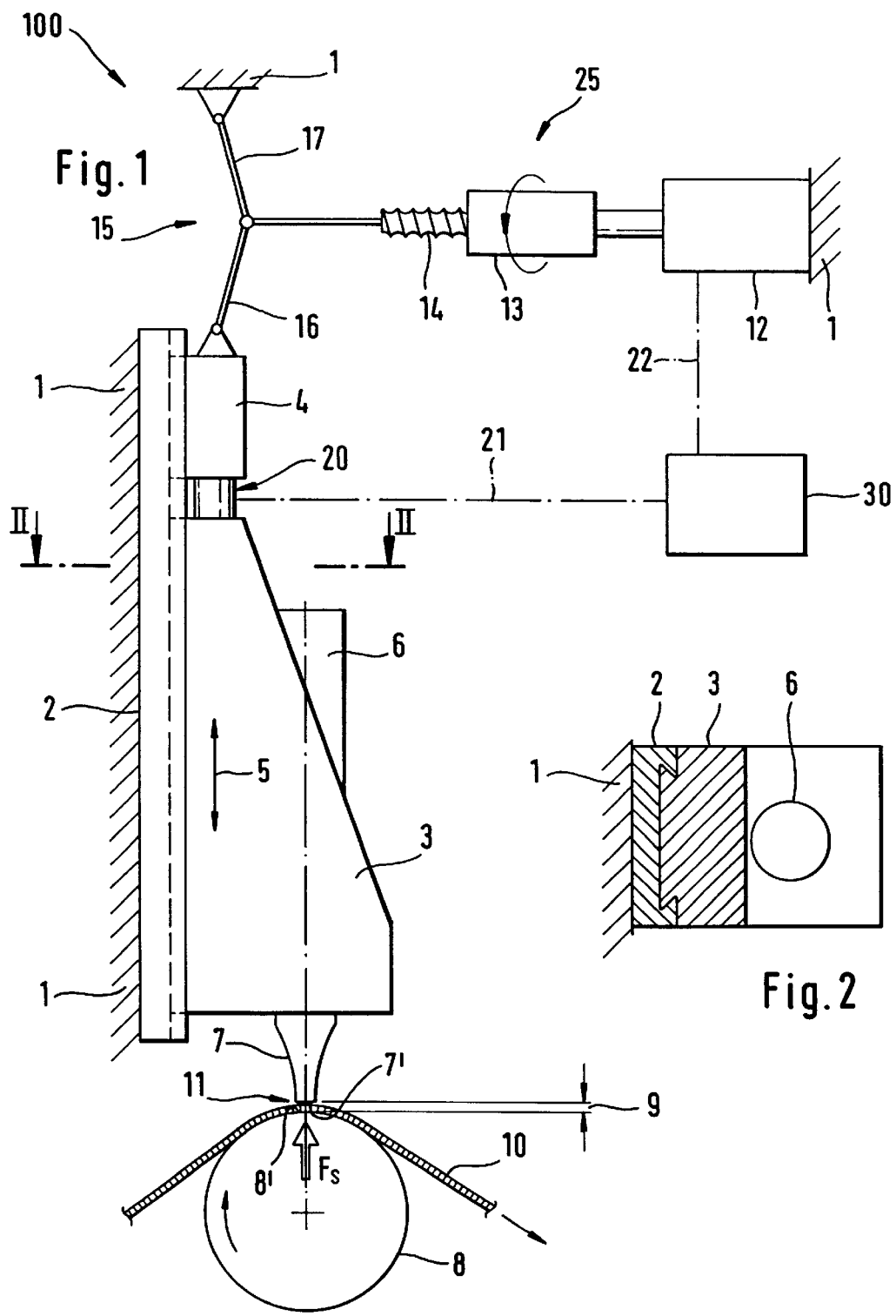

DEVICE FOR PROCESSING A STRIP OF MATERIAL WITH ULTRASOUND

BACKGROUND OF THE INVENTION

The invention relates to a device for processing a continuously moving strip of material. In one such device, an ultrasonic generator unit having a sonotrode also has a facing counter tool, each of which is supported in a machine frame. The strip of material is passed through a gap between the sonotrode and the counter tool. A drive presses the sonotrode against the counter tool, with rigid and positive lock support on the machine frame.

Such a device is described in German Patent DE 195 26 354 C1. The processing includes, for example, reinforcement of a nonwoven made up of thermoplastic fibers, by melting the fibers in certain spots. In order to achieve an optimum processing effect, the distance between the sonotrode and the counter tool, i.e. the sheath surface of the relief applied to it, must be very precisely maintained. For this reason, the known device has a sensor that detects the gap height between the sonotrode and the counter tool, and the signal of this sensor is used to regulate the distance. However, precise and reliable detection of the gap height is a difficult undertaking and requires a complicated measurement device.

Adherence to a certain gap height must take place with such precision because any temperature variations at the sonotrode and the accompanying thermal expansions play a significant role. For this reason, a sensor that detects the temperature of the sonotrode is provided in the device according to German Patent DE 195 13 246 C2, and its signal is used to influence the gap height. However, only a partial aspect of the variable that changes the gap height is detected in this way, namely only the temperature-related displacements.

SUMMARY OF THE INVENTION

The present invention is directed to the task of better maintaining and controlling this gap height so as to provide a more uniform process.

This task is accomplished in the context of a counter tool that has a uniform embossing density. A force measuring member whose signal serves to regulate the drive is placed between the drive and the sonotrode.

By regulating the force exerted by the sonotrode, the other variables that influence the gap height are also detected. If the sonotrode becomes hot, and if the gap height decreases as a result, the force at the sonotrode increases, and the sonotrode has to be pulled back slightly from the counter tool. If the material thickness varies, this is expressed in variations in force, which can be evened out by means of the invention, so that a uniform processing effect is obtained once again.

The force measurement takes into consideration that variable that more or less includes the consequences of the other influence variables. Such a method of regulation takes place with a reference variable that is a direct determinant of the processing effect. In this connection, the measurement of force is significantly simpler, compared with a measurement of distance. At the same time, all the decisive factors are taken into consideration, in contrast to a measurement of temperature, which can only take into consideration the changes in gap height that are attributable to the temperature.

It is important that the sonotrode is supported rigidly, with a positive lock. What this means, of course, is a rigidity that can be achieved by the design, which prevents any elastic retraction of the sonotrode due to the forces transferred by the strip of material, to the greatest extent possible. As a result, there is no vertical swing response of the feed unit if the sonotrode is excited from the direction of the strip of material or the embossing roller. In this way, very high production speeds can be achieved.

However, the pressure force of the sonotrode can only be detected with sufficient accuracy, and used to regulate the gap, if the embossing density of the counter tool remains uniform, i.e. if there is always an equal number of embossing points (force concentration points) under the sonotrode foot as the rotating embossing roller, i.e. the counter tool, turns. The embossing density does not remain uniform, in this sense, if there are lengthwise ridges (parallel to the roller axis), for example, on the embossing roller. During the rotation of such an embossing roller, the force will vary, and there will be maximums at the locations of the lengthwise ridges. Here, the force cannot be clearly detected and used as the basis for regulation. Therefore a uniform, homogeneous embossing pattern, in accordance with a uniform bonding or perforation pattern, must be present, so that as the roller rotates, the contact is essentially constant.

If the force measurement is based on that variable that is a direct determinant of the processing effect, then regulation based on it is only optimal if it can detect the force free of any systematic errors.

To that end, the sonotrode can be moved along with the ultrasonic generator unit on a common carriage on a linear guide directed against the counter tool, with an additional carriage which can be moved on a linear guide on the side on which the drive engages. The force measuring member is arranged between the two carriages. This structure ensures that detection of the force remains free of lateral forces. Because the sonotrode carriage and the additional carriage are jointly guided on the straight-line guide, the force measuring member detects precisely and only those forces that act to press the sonotrode against the counter tool.

An important part of this design is the connection between the carriage at which the drive engages, and the machine frame; while this connection is variable in length, it becomes rigid at a certain length. Because of the rigid support of the sonotrode on the machine frame that is achieved in this way, the device is less sensitive to vibration than, for example, a pneumatic system for pressing the sonotrode down. Therefore the production speeds can be increased with this design of the drive.

German Patent DE 44 39 284 C2 discloses a sonotrode having rigid supports.

BRIEF DESCRIPTION OF THE DRAWINGS

The drawing shows an exemplary embodiment of the present invention, in schematic form.

FIG. 1 shows a side view of the device;

FIG. 2 shows a cross-section taken along line II—II of FIG. 1.

DETAILED DESCRIPTION OF THE INVENTION

The apparatus, designated as a whole as 100 in FIG. 1, includes a vertical straight-line guide in the form of a swallowtail rail 2, affixed on machine frame 1, with a first carriage 3 and a second, additional carriage 4 mounted on it, to move in the direction of arrow 5.

An ultrasonic generator unit 6 is affixed to first carriage 3, and acts on a sonotrode 7 that is directed radially against a relief roller 8 that forms the counter tool. Relief roller 8 has a uniform embossing density, so that sonotrode 7 always meets an essentially constant contact cross-section of the embossing elevations. A strip of material 10, which can be made up of a nonwoven of thermoplastic fibers, is passed through between face 7' of sonotrode 7 and circumference 8' of roller 8, through gap height 9 that is left between them. Because of the high-frequency compressions that the material experiences between the peaks of the embossing elevations of counter roller 8 and face 7' of the sonotrode, local temperature elevations occur, up to softening of the thermoplastic fibers. If the only matter of concern is reinforcement of a nonwoven, heating must be metered in such a way that the fibers just melt together, while holes in the material are avoided. If the energy supply is controlled appropriately, however, such holes can also be intentionally brought about, i.e. perforation or cutting can also take place according to the process. The amount of energy to which a specific location of the strip of material is exposed for the short time while it passes through gap 11 between sonotrode 7 and counter roller 8 is therefore critical for the processing effect. This amount of energy depends on the force prevailing in gap 11. It is plausible that the effects of the ultrasonic vibrations will become all the more obvious, the more the strip of material is compressed in gap 11.

A force measuring member in the form of a load cell 20 is arranged between carriage 4 and carriage 3; it transfers the force exerted by the drive, indicated as a whole as 25, entirely to carriage 3, and thereby gives off a signal that represents the force acting against counter roller 8 in gap 11, except for slight friction losses at swallowtail rail 2. The drive, indicated as a whole as 25, includes a stepper motor 12 that is supported in machine frame 1 and, via a threaded spindle 14, rotates a threaded piece 13 that acts on a knee joint, indicated as a whole as 15, bottom shank 16 of which is mounted on second carriage 4, and top shank 17 of which is mounted on machine frame 1. Knee joint 16, 17 in combination with self-stopping spindle drive 12, 13, 14 represents a rigid support of carriages 3, 4 and sonotrode 7 on machine frame 1, on which counter roller 8 is also mounted, within the framework of what is possible in design terms. In any case, sonotrode 7 does not noticeably move back under the forces transferred from strip of material 10 to sonotrode 7. Carriage 4 keeps any lateral force component that results from the slanted position of shank 16 away from load cell 20.

Load cell 20 can also be arranged at a different location of force transfer between drive 25 and gap 11, e.g. between ultrasonic generator unit 6 and sonotrode 7, or in the region of knee joint 15, but this requires special additional measures in terms of design or circuitry, because of the lateral forces, in order to arrive at a signal that represents the force in gap 11 with as little error as possible. The same holds true analogously if sonotrode 7 is pressed down against counter roller 8 not with a knee joint 15, but by some other device.

The signal of load cell 20 is passed, via line 21, to a control and regulation unit 30 that controls stepper motor 12 via a line 22. The control takes place in such a way that force $F_3$ in gap 11 is kept constant. This means that the processing effect also remains constant, independent of whether strip of material 10 has variations in thickness, sonotrode 7 is subject to thermal expansion, or roller 8 bends through.

What is claimed is:

1. An apparatus for processing a continuously running strip of material, comprising:

a machine frame;

an ultrasonic generator unit supported in the machine frame, the ultrasonic generator comprising a sonotrode;

a counter tool that lies opposite the sonotrode and defining a gap therebetween, the counter tool being supported in the machine frame;

means for passing a strip of material through the gap between the sonotrode and the counter tool;

a drive for pressing the sonotrode against the counter tool, with rigid and positive-lock support on the machine frame; and a force measuring member located between the drive and the sonotrode that provides a signal, wherein the counter tool has a uniform embossing density and the signal serves to regulate the drive so as to provide a constant sonotrode force.

2. The apparatus according to claim 1, further comprising:

a first carriage mounted on a linear guide on which the sonotrode and ultrasonic generator can be moved so that the sonotrode can be urged against the counter tool;

a second carriage mounted on the linear guide which is moved along the guide by the drive, wherein the force measuring member is arranged between the two carriages.

3. The apparatus according to claim 2, wherein the linear guide is mounted to the machine frame and the drive comprises a mechanical, length-variable setting element having two ends, which engages with the second carriage on one end, and with the machine frame on the other end.

4. The apparatus according to claim 3, wherein the length-variable setting element comprises a knee joint that has two shanks.

5. The apparatus according to claim 4, wherein the drive comprises a length-variable force generator, which engages with the machine frame on one side, and with the knee joint on another side.

* * * * *